United States Patent [19]
Politz et al.

[11] 3,991,973
[45] Nov. 16, 1976

[54] CARTRIDGE VALVE WITH MULTIPLE SHUT-OFF

[76] Inventors: William E. Politz, Delphi, Ind. 46923; Gerald E. Christiansen, Flora, Ind. 46929

[22] Filed: Feb. 13, 1975

[21] Appl. No.: 549,543

[52] U.S. Cl. .............................. 251/210; 251/362; 251/DIG. 1
[51] Int. Cl.² ........................................... F16K 1/34
[58] Field of Search ............... 251/210, 362, DIG. 1

[56] References Cited
UNITED STATES PATENTS

| | | | |
|---|---|---|---|
| 2,661,925 | 12/1953 | Barkelew | 251/210 |
| 2,931,385 | 4/1960 | Carlisle et al. | 251/210 X |
| 3,446,239 | 5/1969 | Klenz | 251/210 X |
| 3,844,532 | 10/1974 | Buck | 251/360 |

FOREIGN PATENTS OR APPLICATIONS

| | | | |
|---|---|---|---|
| 214,412 | 8/1956 | Australia | 251/210 |
| 584,503 | 10/1959 | Canada | 251/210 |
| 1,040,976 | 10/1958 | Germany | 251/210 |
| 348,584 | 10/1960 | Switzerland | 251/210 |
| 978,455 | 12/1964 | United Kingdom | 251/210 |

*Primary Examiner*—Arnold Rosenthal
*Attorney, Agent, or Firm*—Robb & Robb

[57] ABSTRACT

There is disclosed faucet construction which incorporates control valve means comprising a plurality of fluid flow regulation instrumentalities constructed to operate sequentially to shut off water flow, including a tapered end seal portion cooperable with a passage through a seat to normally effect such shut-off, a second seal in the form of an O-ring operable when the end seal portion fails to shut off fluid flow, and a third seal surface adjacent the end seal portion operable when the first and second means fail to shut off as desired, with the further provision of seat construction which facilitates replacement by threaded or nonthreaded seat means.

4 Claims, 6 Drawing Figures

CARTRIDGE VALVE WITH MULTIPLE SHUT-OFF

OBJECTS OF THE INVENTION

It is a principal object of this invention to provide valve construction for faucets or the like wherein multiple shut-off means are provided to positively assure that fluid flow will be shut off and that leakage which might result from faulty sealing, is eliminated.

It is a further object of the invention to provide for multiple shut-off by the provision of sequentially operated fluid flow regulating means or instrumentalities, which are arranged so that if one fails to operate, the second will operate to shut off fluid flow, and if the first and second fail to operate, a third means for regulation is brought into position to positively assure that the flow is shut off.

Another object of the invention is to provide simple structure involving stem and bonnet construction together with seat structure which will carry out the objectives of plural shut-off means without any substantial additional expense to that already provided in faucet construction of the class described.

Another object of the invention is to provide fluid flow and sealing instrumentalities which include different types of sealing means, so that upon the failure of one to operate, one of the others will operate to ultimately shut off fluid flow, and assure against the waste of water normally taking place when seat washers of the conventional type are worn so as to permit leakage therearound.

A further object of the invention is to provide seat structure in valve construction of the class described herein, which facilitates the replacement of the seat provided hereby if necessary by a threaded type seat or conversely the removal of a threaded type seat and replacement of a seat not requiring threads with, however, the desired function of positive shut off in any event effected by one or more sealing instrumentalities provided.

Other and further objects of the invention will be undersood from a consideration of the specification appended hereto and disclosed in the drawing, wherein.

DESCRIPTION OF THE INVENTION

Figure 1:
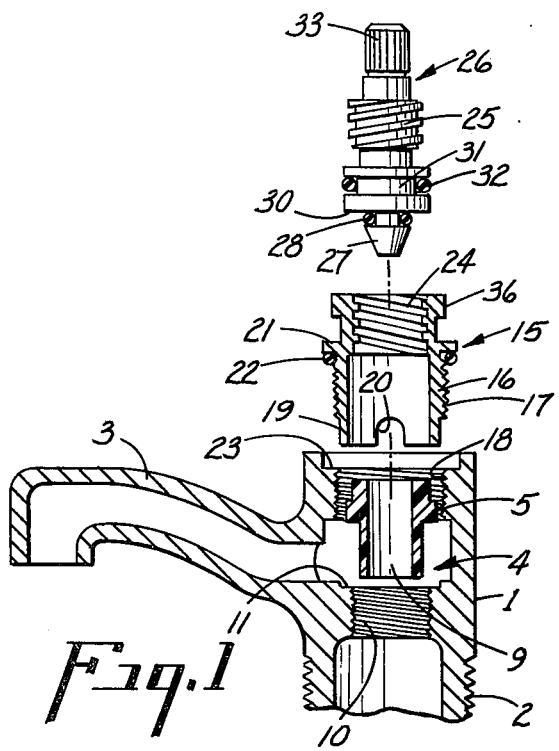
FIG. 1 is a sectional view, partly fragmentary, in exploded form, illustrating the various components of the faucet construction hereof.

Referring to FIG. 1, a single faucet body generally designated 1 is disclosed, having the threaded shank 2 thereon, which provides for the inlet of water thereinto and is normally connected to a supply in any conventional manner, not herein illustrated, since well known.

The body 1 is provided with an outlet in the form of a spout section 3 and intermediate the inlet section 2 and spout section 3 is a valve section generally suggested at 4, which provides for the mounting of the control valve means hereinafter to be described.

Figure 5:
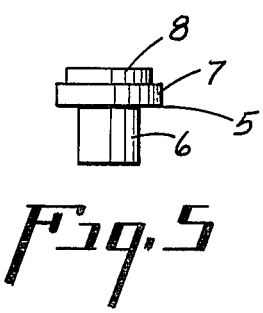

Mounted in the control valve section 4 is a seat 5 being a substantially tubular member, more particularly illustrated in FIG. 5, as including a lower section 6 extending from a shoulder 7 there being a seat portion 8 above said section 7, and a passage 9 extending through the seat 5.

It will be noted that the portion 6 does not have any threads thereon, but is designed to be emplaced in a threaded opening designated 10 formed in the control section 4 hereof, the seat 5 being maintained in place on a shoulder 11 in a manner to be subsequently described.

Figure 6:
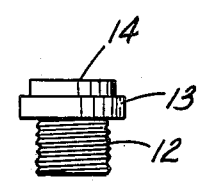
FIG. 6 illustrates a view similar to FIG. 5 of a seat of threaded construction which will replace the seat of FIG. 5 if desired.

The seat 5 herein disclosed in detail, may be replaced if desired with a seat such as illustrated in FIG. 6, which is essentially the same shape generally as that shown in FIG. 5, but includes a threaded lower portion 12, having threads adapted to engage the threads 10 of the valve section 4, with a shoulder 13 and a seat portion 14 thereabove.

The seats of FIGS. 5 and 6 are in most respects identical, the seat of FIG. 6 having a passage therethrough, similar to the passage 9 of FIG. 5.

It is noted, however, that the passage through the seat of FIG. 6 is of such a shape as to permit the use of a tool to effect the threading action desired for positioning of the seat in the threaded opening 10 of the valve section 4, and thus a seat which can replace the seat 5 or alternatively, the seat of FIG. 5 may be used as shown in this illustration herein without threading of the same in place.

Figure 2:
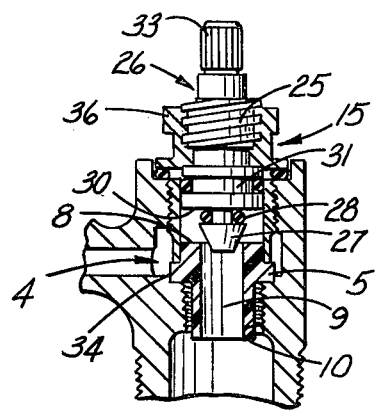
FIG. 2 is a view similar to FIG. 1, also fragmentary, illustrating the various components in assembled, operative position with the valve in open position so that fluid flow is effected therethrough.
Figure 3:
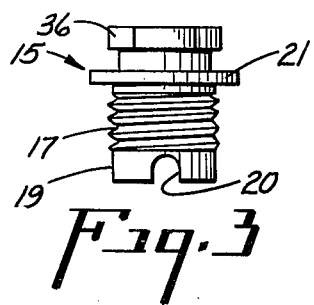
FIG. 3 is a view of one of the elements of the faucet construction denoted as a bonnet in elevation.

In order to maintain the seat disclosed in FIGS. 1 and 2, and illustrated in detail in FIG. 5, in position as shown in FIG. 2, a bonnet generally designated 15 and illustrated by itself in side elevation in FIG. 3, is provided, having a lower section 16 of tubular nature, threaded exteriorly at 17, so as to engage mating threads at 18 in the body 1, with a skirt 19 extending below the threads 16 and provided with notches 20.

The bonnet 15 is equipped with a circumferential shoulder 21, below which an O-ring 22 is positioned, to provide a seal with the body 1, when positioned as shown in FIG. 2.

The bonnet 15 is further provided with suitable threads of the modified acme type, designated at 24 in the upper end of the bonnet 15, which threads are adapted to engage mating threads 25 formed on a stem generally designated at 26.

Figure 4:
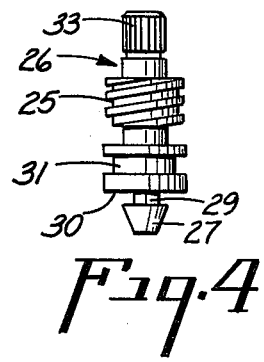
FIG. 4 is a view of the stem and FIG. 5 is a view of the seat of one form in side elevation.

The stem 26 just referred to is equipped with a tapered end seal portion 27 carrying just above the same an O-ring 28 positioned in a suitable groove 29, more particularly shown in detail in FIG. 4, the stem being additionally equipped with a flat seal surface 30 formed on the stem just above the groove 29.

Additionally the stem 26 is equipped with a further groove 31 above the surface 30 which is to receive an O-ring 32.

Above the sealing area the threads 25 are provided, and above that area the stem is broached at 33 so as to receive an operating handle, not illustrated but arranged so that it will turn the stem and the threads 25 thereon to operate in the threads 24 of the bonnet 15, previously described.

With the various parts herein described in detail assembled as shown in FIG. 2, the stem 26 may be manipulated causing the stem to move upwardly and downwardly with respect to the bonnet 15, the bonnet having been threaded in place as shown, so that the end seal portion 27 being tapered moves toward and from the passage 9 because the maximum diameter of the end seal portion 27 is substantially the same as the diameter of the passage 9, control liquid flow through said passage and through the valve section 4.

In the event that for some reason the end seal portion 27 does not shut off the fluid flow, the O-ring 28 carried on the stem will then approach the passage end 9, the end being designated at 34 for the purposes of this description, to thereby shut off the water if necessary.

In the event the O-ring 28 is for some reason ineffective to carry out the shut-off function, the seat seal surface 30 thereon will come into engagement with the upper end of the seat 5, designated at 8, to thereby positively assure that fluid does not flow through the passage 9.

It will thus be clear that a series of shut-off means carried by the stem is provided for positively shutting off fluid flow through the body 1 as desired, and necessary, to prevent water waste therethrough.

In order to maintain the seat just referred to and described in detail, denoted 5, in place, the skirt 19 on the bonnet 15 will be observed as engaging the upper surface of the shoulder 7 of the seat 5 to maintain the seat in position on the shoulder 11 in valve section 4.

It will also be noted that since the bonnet 15 can be removed by a wrench section 36 formed thereon, the seat 5 may be replaced by a seat such as shown in FIG. 6, and the empty bonnet again inserted and manipulated to bring the skirt 19 into position similar to that shown in FIG. 2.

In any event, it will be necessary to provide for the flow of water from the upper end of the seat passage 9, and for that purpose the notches 20 are provided.

The construction illustrated herein thus makes possible positive shut off in virtually any circumstance wherein fluid flow might otherwise be effected, and thus water waste take place, by reason of the three seal arrangement, the end seal portion being usually sufficient for the purposes hereof, and the other sealing means being usable in the event of failure of the seal portion 27 to be effective.

Since the seat is maintained in place by the bonnet, normal construction of the valve hereof, it may be replaced easily, and if desired a further seat may be used in the event of some possible failure of sealing with the contruction illustrated in FIGS. 1 and 2.

We claim:

1. In faucet construction of the class described, in combination, a faucet body, an inlet and an outlet therefor, a control valve section intermediate said inlet and outlet, said section including provisions for mounting control valve means therein, said means comprising a threaded portion to receive a threaded seat and a non-threaded seat of generally similar dimensions and configuration, a seat, a bonnet, and a stem, the stem having a plurality of shut-off means carried thereby in fixed relationship to one another, operable sequentially in the closing direction movement of said stem at predetermined uniform intervals, the bonnet having means thereon to engage the non-threaded seat when the same is in place to maintain the same in sealed position in the section.

2. The combination as claimed in claim 1, wherein the stem includes a tapered end seal portion and the seat a liquid passage therethrough, said end seal portion being arranged to regulate liquid flow through said passage when the stem is moved toward and from the passage, an O-ring is mounted on the stem adjacent the end seal portion, and said O-ring is adapted to regulate liquid flow through the liquid passage when the end seal portion fails to do so.

3. The combination as claimed in claim 2, wherein the stem is provided with an O-ring mounted on the stem adjacent the end seal portion and operable to regulate liquid flow through the passage when the end portion fails to do so, and the stem includes a seat seal surface adjacent the end seal portion engageable with a mating surface on the seat to regulate fluid flow through the passage upon failure of the end seal portion and O-ring to effect such regulation.

4. The combination as claimed in claim 1, wherein the control valve section includes a threaded passage formed to receive and maintain a threaded seat therein, and the seat positioned therein is non-threaded being positioned by the bonnet for fluid flow contol.

* * * * *